July 12, 1966 G. DESAULNIERS 3,260,253
CRANKCASE EXPLOSION SHUTDOWN UNIT
Filed Aug. 31, 1964 2 Sheets-Sheet 1
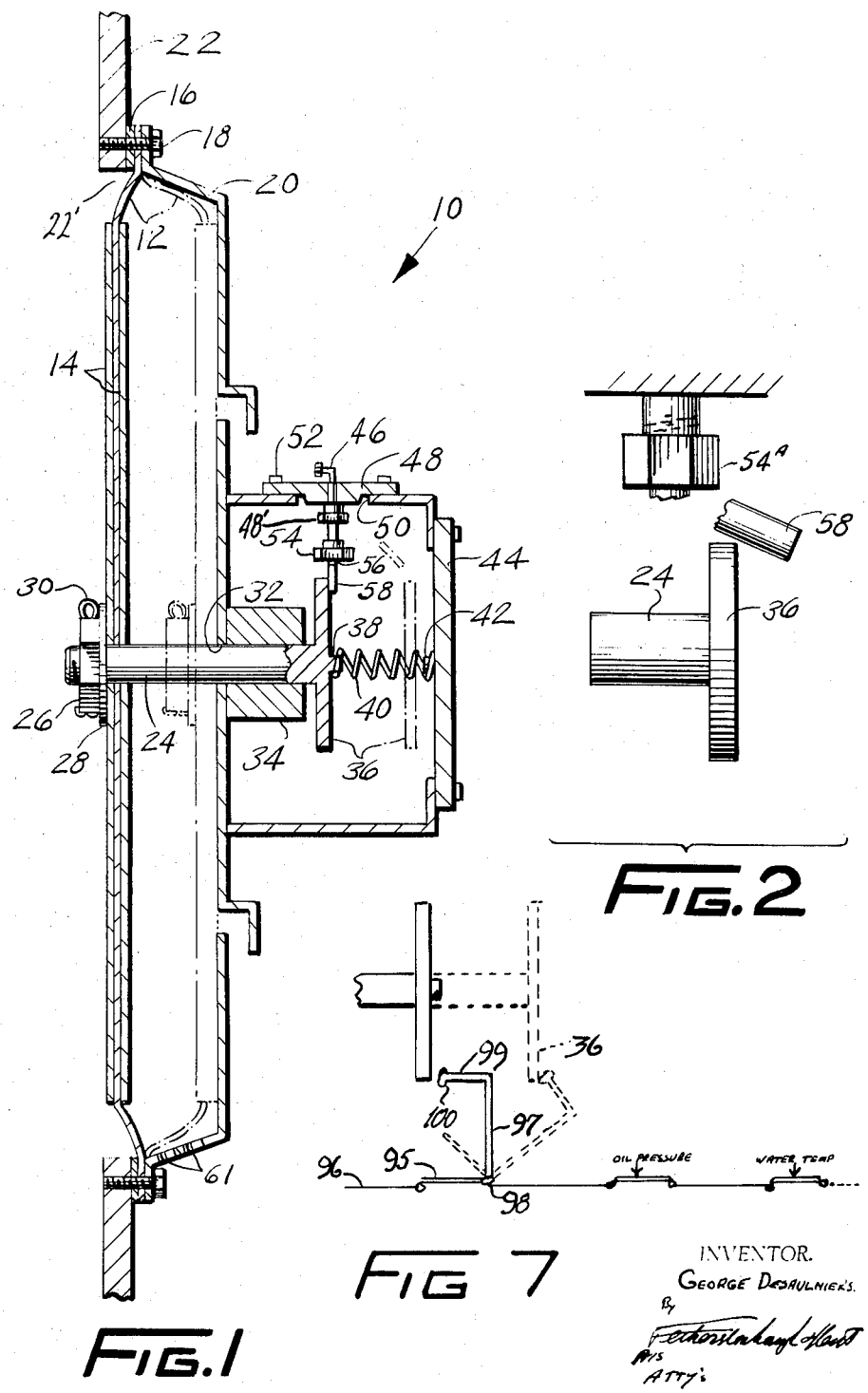
INVENTOR.
GEORGE DESAULNIERS July 12, 1966 G. DESAULNIERS 3,260,253
CRANKCASE EXPLOSION SHUTDOWN UNIT
Filed Aug. 31, 1964 2 Sheets-Sheet 2
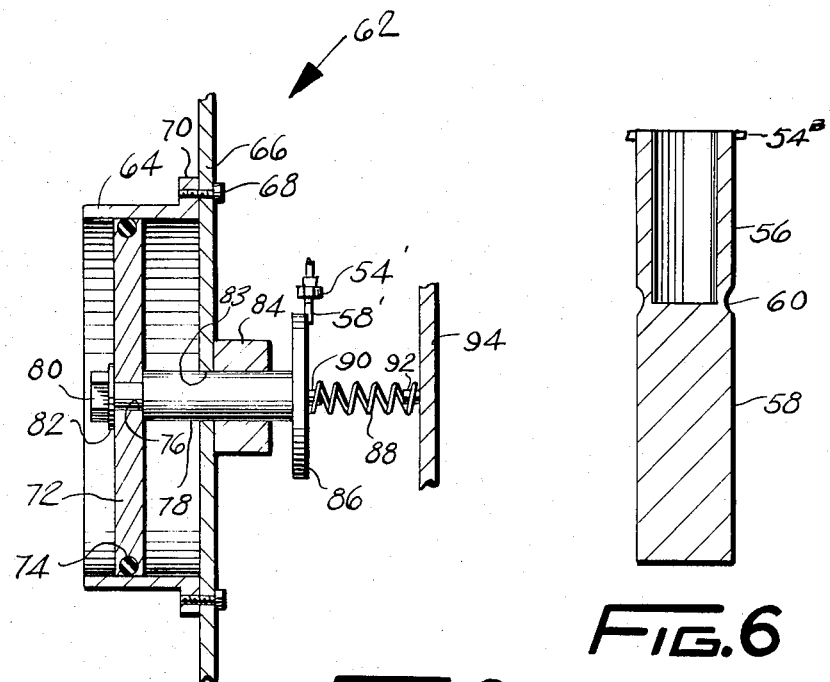
FIG.3
FIG.6
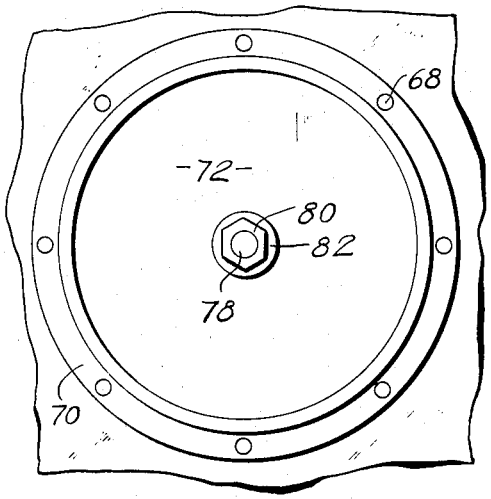
FIG.4
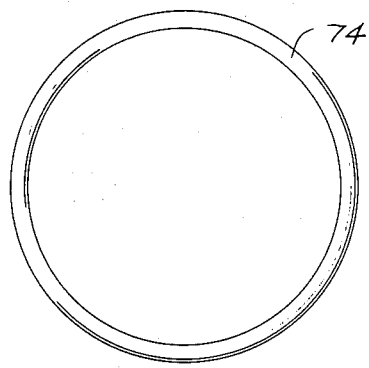
FIG.5
INVENTOR.
GEORGE DESAULNIERS
HIS ATT'YS

United States Patent Office 3,260,253
Patented July 12, 1966

3,260,253
CRANKCASE EXPLOSION SHUTDOWN UNIT
George Desaulniers, Box 639, Moosomin,
Saskatchewan, Canada
Filed Aug. 31, 1964, Ser. No. 393,298
9 Claims. (Cl. 123—198)

This invention relates to safety devices for two or four stroke reciprocating engines and the like.

It is an object of the present invention to provide a crankcase explosion shutdown unit which will serve to increase the safety factor involved in the operation of natural or other gas and oil compressor stations in industry to further protect the personnel who operate the machines.

Another object of the present invention is to provide a crankcase explosion shutdown unit which will be used on either an instrument air automatic shutdown system or with electric shutdown systems.

A further object of the present invention is to provide a crankcase explosion shutdown unit which, in the event of a crankcase explosion, the pressure the explosion produces will force the diaphragm of the device to rest on the diaphragm body and during its travel will force the lip of the shaft to strike a knockout air bleed, thus breaking it clean and completely off of its position and giving an instant air bleed from the automatic shutdown system, and therefore instantly stopping the unit involved.

A still further object of the present invention is to provide a crankcase shutdown unit which will be adaptable to any make of engine used in compressor stations, and the device will be secured to one of the inspection doors without disturbing the operation of the engine.

Other objects of the invention are to provide a crankcase explosion shutdown unit bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawings in which:

FIGURE 1 is a side view of the present invention shown in section.

FIGURE 2 is an enlarged fragmentary side view of the air bleed member shown sheared off.

FIGURE 3 is a side view of a modified form of the invention shown in section.

FIGURE 4 is an end view of FIGURE 3.

FIGURE 5 is a plan view of the piston ring shown removed from FIGURE 3.

FIGURE 6 is an enlarged vertical view of the knockout air bleed shown removed from the invention and shown in section.

FIGURE 7 is a fragmentary side elevation showing the device associated with an electrical shutdown system.

In the drawings like characters of reference indicate corresponding parts in the dfferent figures.

Compressor stations situated along the length of a natural gas pipe line or the like, normally utilize the natural gas from the pipe line in order to operate the engines which in turn drive the compressors.

These engines are normally of two and four stroke design and it will be appreciated that the mixture of natural gas and air which enters the crankcase is highly inflammable.

There are several reasons why this gas and air mixture sometimes explodes in the crankcase occasionally and when such an explosion takes place, it is essential that the engine be shutdown immediately in order to minimize the damage to the engine and danger to the personnel because under existing systems, such engines have to be shutoff manually if such an explosion occurs.

All conventional engines used for this purpose incorporate an automatic instrument air shutdown system or an electrical shutdown system or both, but such systems are normally incorporated with the engine in order to shutdown the engine if such things as low oil pressure, high water temperature, over speeding, or other similar forms occur.

The present device is adapted to tie in with the automatic air instrument line or the electrical shut down system or both, whichever is utilized on the engine to which my device is installed.

Referring now more in detail to the drawing, a crankcase explosion shutdown unit 10 made in accordance with the present invention is shown to include a circular diaphragm 12 made of suitable flexible material which is received between a pair of plates 14 and secured adhesively thereto. A gasket 16 is received against the inner perimetrical edge of diaphragm 12 and a plurality of bolts 18 are received through crankcase door 20, gasket 16 and diaphragm 12 and thus secures diaphragm 12 to crankcase 22, around the periphery of inspection door opening 22'. A bolt or spindle 24 is sealably received through the center of diaphragm 12 and plates 14, and a nut fastener 26 and a washer 28 are received on bolt 24 with a cotter key 30 received by nut fastener 26 and bolt 24 to prevent nut 26 from unthreading from bolt 24. Bolt 24 is freely and slidably received within opening 32 of crankcase door 20 and is freely and slidably received within bushing 34 which is fixedly secured to crankcase door 20. Bolt 24 is provided with a flanged end 36 for a purpose which hereinafter will be described. A centrally located extension 38 of bolt 24 mounts one end of a compression coil spring 40 which provides a means for normally biasing diaphragm 12 in the position shown in FIG. 1 against the normal crankcase pressure. The other end of coil spring 40 engages a projection 42 of a cover plate 44 on crankcase door 20. A screw threaded hollow fitting 46 is secured within a plate 48 by nut 48' which is secured over opening 50 of crankcase door 20 by means of a plurality of bolts 52. A knockout air bleed 54 is secured to fitting 46 by nut 54A engaging a lip 54B. One end 56 of knockout air bleed 54 is hollow, and the other end 58 is solid and an annular groove 60 around the outer periphery of air bleed 54 provides a means for end 58 to break off clean and sharp when excessive crankcase pressures from an explosion urges flange 36 against the end 58 of air bleed 54 overcoming pressure of spring 40. Fitting 46 is secured by copper tubing (not shown) and is connected at its other end to the conventional instrument air supply of the automatic shutdown system (not illustrated). A plurality of spaced apart openings 61 through the bottom of crankcase door 20 provides drainage means for oil or moisture which may accumulate within crankcase door 20.

In operation, when an explosion occurs in crankcase 22, the excessive pressure generated by the explosive force acts against diaphragm 12, thus moving bolt 24 outwardly, which in turn instantly causes flange 36 of bolt 24 to snap off end 58 of air bleed 54 and providing an instant air bleed from the automatic shutdown system which will serve to instantly stop the engine.

It should be noted that there is sufficient clearance between bolt 24 and opening 32 to prevent bolt 24 from freezing or sticking at any time.

A modified form of crankcase explosion shutdown unit 62 is shown in FIG. 3 to include a hollow cylinder 64 which is secured to crankcase 66 by means of a plurality of spaced apart bolts 68 which are threadingly received within an annular flange 70 of cylinder 64. A cylindrical piston 72 is provided with an annular resilient piston ring 74 which is received within the recessed area of the outer periphery of piston 72. Piston ring 74 provides a seal between piston 72 and the interior wall of cylinder 64. A central opening 76 through piston 72 receives a bolt 78 which threadingly receives a nut 80 against a washer 82. Bolt 78 is freely and slidably received with an opening 83 of crankcase 66 and is freely and slidably received within bushing 84 secured to crankcase 66. A flange 86 on the end of bolt 78 provides a means for shearing ends 58' from air bleed 54' when explosion pressures actuate piston 72. A coil spring 88 is received over an extension 90 of bolt 78 at one end and the other end is received over a projection 92 of plate 94 and thus provides a means of preventing flange 86 from shearing end 58' until an explosion occurs within crankcase 66.

In operation, piston 72 urges shaft 78 against the spring 88, and thus the flange 86 of bolt 78 shears end 58' from the air bleed 54' which functions in the same capacity as that heretofore described in the main embodiment of the present invention.

The two embodiments illustrated in FIGS. 1 and 3 can both be utilized in engines which include an electrical shutdown system.

Such shutdown systems normally include a plurality of conventional snap lock switches or breakers connected in series with one side of the ignition system. These individual snap locks, switches, or breakers are connected to the oil pressure system, the water temperature system, the high speed indicator, and the like, so that if any one of the switches or breakers is actuated, the ignition circuit is broken thus immediately shutting down the engine.

In FIG. 7 the flange 36 is connected to an additional snap lock, switch or breaker 95 connected in series with one side 96 of the ignition system (not illustrated). The method of connection includes an arm 97 secured at the pivot point 98 of the breaker switch 95, said arm 97 having a right angulated upper end portion 99 which in turn is provided with an enlarged contact extremity 100 adjacent the flange 36.

When the flange moves from the position shown in FIGURE 7 in full lines, to the position shown in phantom, the breaker switch is opened as shown in phantom in FIGURE 7 thus breaking the ignition circuit and stopping the engine immediately.

Since various modifications can be made in my invention as hereinabove described, and many apparently widely different embodiments of same made within the spirit and scope of the claims without depatrting from such spirit and scope, it is intended that all matter contained in the accompanying specification shall be interpreted as illustrative only and not in a limiting sense.

What I claim as my invention is:

1. A crankcase explosion shutdown unit for two and four stroke engines which include an engine shutdown system; comprising in combination pressure responsive reciprocable means secured to the wall of said crankcase and extending movably therethrough, a hollow cover secured externally to said crankcase and enclosing said reciprocable means, spring means reacting between said reciprocable means and said hollow cover normally biasing said reciprocable means inwardly of said crankcase against normal operating crankcase pressures, and means mounted on said cover operatively connected to said engine shutdown system, said last mentioned means extending into said cover, said last mentioned means being operable by said pressure responsive reciprocable means when explosive pressure occurs in said crankcase.

2. The device according to claim 1 in which said crankcase is apertured, said pressure responsive reciprocable means including a diaphragm spanning said aperture and being sealably mounted to the wall of the said crankcase defining said aperture, a bolt centrally secured to said diaphragm and extending into said cover, and means on said cover bearably suporting said bolt for lengthwise movement.

3. The device according to claim 2 in which said means mounted on said cover operatively connected to said engine shutdown system comprises a knock out air bleed operatively connected to the conventional engine instrument air system, said air bleed comprising a spindle having a hollow end and a solid end, said solid end being within said cover, and an annular groove around said spindle at the junction between said ends to facilitate the breaking off of said solid end when engaged by said bolt thus exposing said hollow end.

4. The device according to claim 3 which includes a flange formed on the end of said bolt extending into said cover.

5. The device according to claim 1 in which said pressure responsive reciprocable means includes a cylinder secured to said crankcase and extending inwardly thereof, a piston reciprocable in said cylinder, a bolt secured to said piston and extending through said crankcase wall into said cover, spring means reacting between said bolt and said cover normally biasing said bolt and piston inwardly of said crankcase against normal operating crankcase pressures, and means mounted on said cover operatively connected to said engine shutdown system, said last mentioned means extending into said cover, said last mentioned means being operable by said bolt when explosive pressure occurs in said crankcase.

6. The device according to claim 5 in which said means mounted on said cover operatively connected to said engine shutdown system comprises a knock out air bleed operatively connected to the conventional engine instrument air system, said air bleed comprising a spindle having a hollow end and a solid end, said solid end being within said cover, and an annular groove around said spindle at the junction between said ends to facilitate the breaking off of said solid end when engaged by said bolt thus exposing said hollow end.

7. The device according to claim 5 which includes a flange formed on the end of said bolt extending into said cover.

8. The device according to claim 2 in which said means mounted on said cover operatively connected to said engine shutdown system comprises an electrical switch wired in series with the ignition system of said engine, said bolt engaging said switch to open same responsive to outward movement of said bolt by explosive pressure in said crankcase.

9. The device according to claim 5 in which said means mounted on said cover operatively connected to said engine shutdown system comprises an electrical switch wired in series with the ignition system of said engine, said bolt engaging said switch to open same responsive to outward movement of said bolt by explosive pressure in said crankcase.

References Cited by the Examiner

UNITED STATES PATENTS

| | | | |
|---|---|---|---|
| 2,600,810 | 6/1952 | St. Lucas | 123—198 |
| 2,724,378 | 11/1955 | Wellman | 123—198 |
| 2,997,038 | 8/1961 | Peters | 123—198 |
| 3,199,523 | 8/1965 | McEathron | 123—198 X |

MARK NEWMAN, *Primary Examiner.*

A. L. SMITH, *Assistant Examiner.*